Aug. 1, 1961
J. T. FRASER
2,994,787
FREQUENCY TRACKER
Filed Dec. 19, 1958
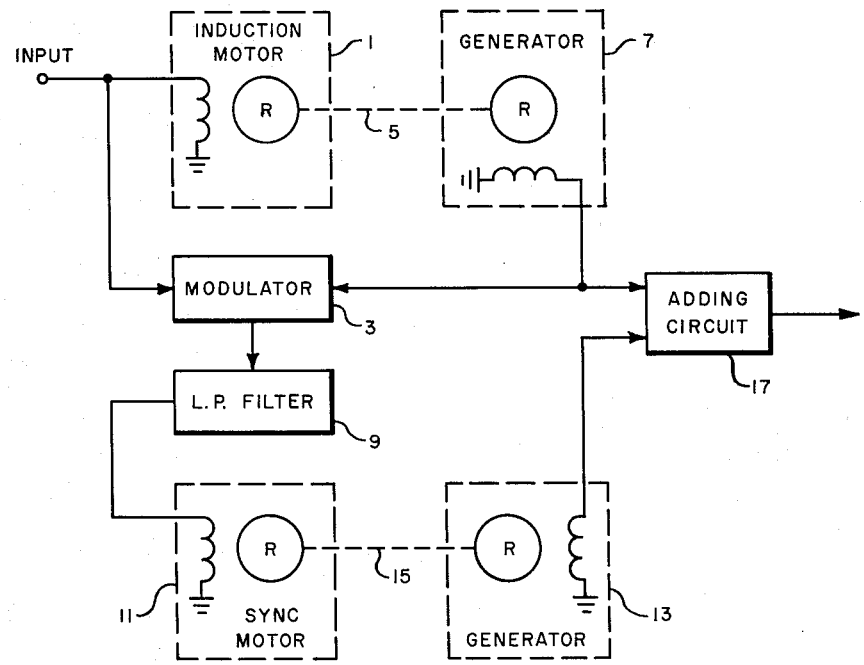
$Fig. 1$
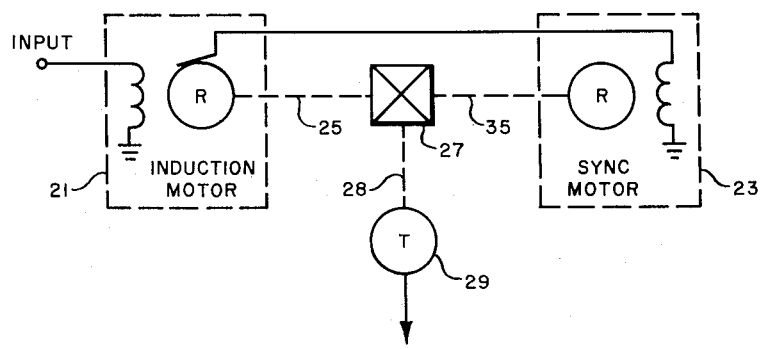
$Fig. 2$
INVENTOR.
J. T. FRASER
BY *H. S. Mackey*
ATTORNEY.

United States Patent Office 2,994,787
Patented Aug. 1, 1961

2,994,787
FREQUENCY TRACKER
Julius T. Fraser, Pleasantville, N.Y., assignor to General Precision, Inc., a corporation of Delaware
Filed Dec. 19, 1958, Ser. No. 781,643
5 Claims. (Cl. 307—84)

This invention relates to frequency trackers and more particularly to frequency trackers which utilize synchronous motors as the frequency determining element.

Synchronous motors have been used for some time to track or determine the frequency of a cyclically changing or alternating electric signal and will perform this task with accuracy and reliability so long as the frequency being tracked does not exceed about 2 kc. Synchronous motors can be constructed to exceed this limit, but at increased size, weight and cost. Furthermore, the bandwidth over which such special motors will operate is inadequate or impracticable for numerous applications.

For example, radar Doppler navigational devices used to determine the ground speed of aircraft require frequency trackers which can accurately and reliably determine the center frequency of a wide band audio signal, 0–10 kc., having a low signal-to-noise ratio. These requirements impose conditions which make the construction and use of synchronous motors for direct frequency tracking impractical, if not impossible.

Therefore, one object of this invention is to provide a frequency tracker utilizing a synchronous motor as the frequency determining element which is capable of tracking a cyclically changing or alternating signal of high frequency and large bandwidth.

Another object of the invention is to provide a frequency tracker which is accurate and reliable over the range stipulated above and which is inexpensive to manufacture.

A further object of the invention is to provide a frequency tracker which is suitable for tracking the center frequency of a radar Doppler signal and which automatically acquires the signal center frequency without the need for additional equipment.

The invention contemplates a frequency tracker, comprising an induction motor adapted to be connected to a source of alternating signal voltage the frequency of which is to be tracked, a synchronous motor, means connected between said induction motor and said synchronous motor for supplying the said synchronous motor with an alternating voltage having a frequency corresponding to the slip frequency of the induction motor, and means connected to the outputs of said motors for adding the outputs.

The foregoing and other objects and advantages of the invention will appear more clearly from a consideration of the specification and drawings wherein several embodiments of the invention are described and shown in detail for illustration purposes only.

In the drawings:

FIGURE 1 is a block diagram of a novel frequency tracker constructed in accordance with the invention; and FIGURE 2 is a block diagram of another embodiment of the novel frequency tracker shown in FIGURE 1.

In FIG. 1 alternating electric signals of undetermined frequency, from a source not shown, are applied to an induction motor 1 and to one input of a modulator 3. The shaft 5 of induction motor 1 is drivingly coupled to a generator 7 and the output of generator 7 is applied to another input of modulator 3. The two signals applied to modulator 3 are mixed to obtain the sum and difference of the input frequencies and the output is passed through a low pass filter 9 which passes the difference frequency.

The difference frequency which represents the slip frequency of induction motor 1 is applied to a synchronous motor 11 which is drivingly connected to a generator 13 by a shaft 15. The outputs of generators 7 and 13 are added in a circuit 17 the output of which corresponds to the frequency of the alternating electric signal of undetermined frequency.

The advantage of this arrangement stems from the fact that the output of the induction motor 1 need not be linear or reproduceable since the accuracy of the result is dependent entirely on the accuracy of the synchronous motor 11. Furthermore, the frequency range required of the synchronous motor 11 is well within its capabilities.

In the embodiment shown in FIG. 2 the alternating electric signal of undetermined frequency is applied to an induction motor 21 which is drivingly coupled to one input of a differential 27 by a shaft 25. A tap 22 on the rotor of induction motor 21 provides an alternating electric signal having a frequency which corresponds to the slip frequency of the motor 21. This signal is applied to a synchronous motor 23 which is drivingly connected to another input of differential 27 by a shaft 35. Differential 27 adds the output of both motors and operates a tachometer 29 through its output shaft 28. This arrangement is made possible since the current in the rotor of induction motor 21 is proportional to the slip frequency of the motor. Here, as with the device shown in FIG. 1, the output of induction motor 21 need not be linear since the accuracy of the result is dependent entirely on the accuracy of synchronous motor 23 and the range required of motor 23 is well within its capabilities.

Although several embodiments of the invention have been shown and described in detail for illustration purposes it is to be expressly understood that the invention is not to be limited thereto.

What is claimed is:

1. A frequency measuring device comprising, an induction motor adapted to be connected to a source of alternating signal voltage, a synchronous motor, means connected between said induction motor and said synchronous motor for supplying to said synchronous motor an alternating voltage having a frequency which corresponds to the slip frequency of the induction motor, and means connected to the outputs of said induction and synchronous motors for adding the respective outputs.

2. A frequency tracker comprising, an induction motor adapted to be connected to a source of alternating signal voltage the frequency of which is to be determined, first means connected to said motor for supplying an electric signal corresponding in frequency to the rotation of the motor, modulating means connected to said alternating signal voltage source and said first means for providing an electric signal which corersponds in frequency to the difference between the frequencies of the inputs to the modulating means, a synchronous motor connected to said modulating means and rotated at a speed which corresponds to said difference frequency, second means connected to said synchronous motor for supplying an electric signal corresponding to the rotation of said synchronous motor, and means for adding the outputs of said first and second means.

3. A frequency tracker comprising, an induction motor adapted to be connected to a source of alternating signal voltage the frequency of which is to be determined, a first electric signal generator drivingly connected to said induction motor, an electric signal modulating means having one input connected to said alternating signal voltage source and another input connected to said first generator for supplying an electric signal having a frequency corresponding to the difference in frequency between the input frequencies to the modulator, a synchronous motor connected to said modulating means and adapted to rotate at a speed corresponding to said difference frequency, a second electric signal generator drivingly connected to said synchronous motor, and means connected to said first and second generators for adding the generator outputs.

4. A frequency tracker, comprising an induction motor adapted to be connected to a source of alternating signal voltage, a synchronous motor connected to the rotor of said induction motor and adapted to operate at the frequency of the induction motor rotor current, and means connected to the induction and synchronous motor outputs for adding said outputs.

5. A frequency tracker as defined in claim 4 wherein said means for adding the outputs of the induction and synchronous motors comprises a differential gearing mechanism which supplies a shaft output corresponding to the sum of the motor inputs.

References Cited in the file of this patent

UNITED STATES PATENTS

| | | |
|---|---|---|
| 2,433,194 | Bedford et al. | Dec. 23, 1947 |
| 2,760,130 | Carney | Aug. 21, 1956 |